(12) United States Patent
Premysler et al.

(10) Patent No.: US 10,816,188 B2
(45) Date of Patent: Oct. 27, 2020

(54) CABINET LIGHT FOR THE ILLUMINATION OF A CABINET INTERIOR

(71) Applicant: RITTAL GMBH & CO. KG, Herborn (DE)

(72) Inventors: Ewgenij Premysler, Frankfurt am Main (DE); Marco Deusing, Herborn (DE); Kurt-Michael Schaffer, Eckental (DE)

(73) Assignee: RITTAL GMBH & CO. KG, Herborn (DE)

(*) Notice: Subject to any disclaimer, the term of this patent is extended or adjusted under 35 U.S.C. 154(b) by 156 days.

(21) Appl. No.: 16/082,330

(22) PCT Filed: Apr. 6, 2017

(86) PCT No.: PCT/DE2017/100269
§ 371 (c)(1),
(2) Date: Sep. 5, 2018

(87) PCT Pub. No.: WO2017/182031
PCT Pub. Date: Oct. 26, 2017

(65) Prior Publication Data
US 2019/0086073 A1    Mar. 21, 2019

(30) Foreign Application Priority Data

Apr. 18, 2016 (DE) .................. 10 2016 107 149
Apr. 22, 2016 (DE) .................. 10 2016 107 569

(51) Int. Cl.
*F21V 33/00* (2006.01)
*F21V 5/04* (2006.01)
(Continued)

(52) U.S. Cl.
CPC ............ *F21V 33/0012* (2013.01); *F21S 4/28* (2016.01); *F21V 5/045* (2013.01); *F21V 17/02* (2013.01);
(Continued)

(58) Field of Classification Search
CPC ...... F21V 33/0012; F21V 5/045; F21V 17/02; F21S 4/28; H02B 1/306; F21W 2131/301
(Continued)

(56) References Cited

U.S. PATENT DOCUMENTS

| 5,032,957 A | * | 7/1991 | Canfield | ................ A47B 81/00 362/133 |
| 9,955,601 B2 | | 4/2018 | Premysler et al. | |

(Continued)

FOREIGN PATENT DOCUMENTS

| DE | 202010012968 U1 | 2/2011 |
| DE | 202012001584 U1 | 3/2012 |

(Continued)

OTHER PUBLICATIONS

International Search Report (in English and German) and Written Opinion (in German) issued in PCT/DE2017/100269, dated Jun. 19, 2017; ISA/EP.

*Primary Examiner* — Cara E Rakowski
*Assistant Examiner* — Jessica M Apenteng
(74) *Attorney, Agent, or Firm* — Harness, Dickey & Pierce, P.L.C.

(57) ABSTRACT

The invention relates to a control cabinet light for illuminating a control cabinet interior, wherein the control cabinet light comprises a light base member which holds an illuminating means of the control cabinet light and a transparent illuminating means cover mounted at the light base member, said cover transparently surrounding the illuminating means, characterized in that the illuminating means cover has two transparent separated parallel sides between which the illuminating means is disposed when the illuminating means cover is placed on the light base member, wherein the illuminating means comprises a flat illuminating means plate on which a plurality of individual illuminating means, in particular LEDs or OLEDs, are distributed, and wherein the
(Continued)

illuminating means plate extends parallel or at an angle of more than 0°, in particular less than an angle of about 45°, relative to the parallel sides of the illuminating means cover.

6 Claims, 5 Drawing Sheets

(51) Int. Cl.
   *F21V 17/02* (2006.01)
   *H02B 1/30* (2006.01)
   *F21S 4/28* (2016.01)
   *F21W 131/301* (2006.01)
(52) U.S. Cl.
   CPC ....... *H02B 1/306* (2013.01); *F21W 2131/301* (2013.01)
(58) Field of Classification Search
   USPC .......................................................... 362/240
   See application file for complete search history.

(56) References Cited

U.S. PATENT DOCUMENTS

| | | | |
|---|---|---|---|
| 10,030,689 | B2 | 7/2018 | Thielmann et al. |
| 2002/0118537 | A1 | 8/2002 | Segretto |
| 2016/0369958 | A1* | 12/2016 | Kohshima ................ F21S 4/28 |
| 2017/0064848 | A1 | 3/2017 | Premysler et al. |
| 2017/0074312 | A1 | 3/2017 | Thielmann et al. |
| 2017/0328528 | A1 | 11/2017 | Hoffmeister |

FOREIGN PATENT DOCUMENTS

| | | |
|---|---|---|
| DE | 102011122204 B3 | 3/2013 |
| DE | 202015106929 U1 | 1/2016 |
| DE | 102014013655 A1 | 3/2016 |
| EP | 0657708 A1 | 6/1995 |
| JP | 2003116726 A | 4/2003 |
| KR | 101602845 B1 | 3/2016 |

\* cited by examiner

PRIOR ART

CABINET LIGHT FOR THE ILLUMINATION OF A CABINET INTERIOR

CROSS-REFERENCE TO RELATED APPLICATIONS

This application is a 371 U.S. National Stage of International Application No. PCT/DE2017/100269, filed on Apr. 6, 2017, which claims priority to German Application No. 10 2016 107 149.8, filed on Apr. 18, 2016, and to German Application No. 10 2016 107 569.8, filed on Apr. 22, 2016. The entire disclosures of the above applications are incorporated herein by reference.

FIELD

The invention proceeds from a control cabinet light for illuminating a control cabinet interior, wherein the control cabinet light comprises a light base member which holds an illuminating means of the control cabinet light and an illuminating means cover mounted at the light base member, said cover transparently surrounding the illuminating means. Such a control cabinet light is known from DE 10 2011 122 204 B3.

BACKGROUND

This section provides background information related to the present disclosure which is not necessarily prior art.

Depending on the application, a control cabinet light is mounted inside the control cabinet in various positions and directions, usually depending on where there is still space for the control cabinet light, considering the design of the interior space of the control cabinet, depending on the preferred angle from which the control cabinet light is to illuminate the inside of the control cabinet. However, these factors vary from application to application so that a control cabinet light with a standard radiation profile can often only achieve an unsatisfactory compromise with regard to achievable control cabinet lighting. In extreme cases, it can even be the case that the control cabinet light has to be positioned so unfavorably due to the lack of space inside the control cabinet that the light produces a glare effect which hinders a person standing in front of the opened cabinet door. This is often caused by the fact that in control cabinet lights which are activated by a light or motion sensor, the detection angle of the sensor lies within the radiation angle of the illuminating means. For example, the light or motion sensor can be pointed at the control cabinet door so that at least some of the light issuing from the illuminating means also radiates in the direction of the control cabinet door, thereby possibly blinding a person standing in front of the control cabinet, and on the other hand is not available for the purposes of illuminating the inside of the control cabinet.

SUMMARY

This section provides a general summary of the disclosure, and is not a comprehensive disclosure of its full scope or all of its features.

Therefore, the problem to be solved by the invention is to further develop a control cabinet light of the type described such that on one hand, the light has less of a glare effect and on the other hand a more effective illumination of the inside of the control cabinet is facilitated.

Accordingly, the illuminating means cover has two transparent parallel sides at a distance from one another, between which the illuminating means is disposed when the illuminating means cover is placed on the light base member, wherein the illuminating means comprises a flat or substantially flat illuminating means plate on which a plurality of individual illuminating means, in particular LEDs or OLEDs, are distributed, and wherein the illuminating means plate extends parallel or at an angle of more than 0°, in particular less than an angle of about 45°, relative to the parallel sides of the illuminating means cover. The use of an illuminating means plate having a plurality of illuminating means disposed thereon causes the illuminated light to be substantially more directed since the plate has an aperture or reflector effect, the plate not radiating in the direction opposite to a side of the plate comprising the individual illuminating means. In particular, the individual illuminating means can only be disposed and/or be selectively controllable on one of the two opposing plate sides.

Furthermore, the illuminating means cover can be mountable in two positions on the light base member, the positions being rotated relative to one another by 180° in a rotation plane by way of symmetrically disposed fasteners, wherein a light guide of the illuminating means cover, in particular a reflector or a lens, can be disposed at an angle of more than 0° relative to the rotation plane so that the light guide has a different orientation relative to the illuminating means in the two positions of the illuminating means cover rotated by 180° relative to one another.

By bending the light guide, in particular a reflector, relative to the rotation plane of the illuminating means cover, the light guide causes a different radiation characteristic of the control cabinet light in the two positions rotated by 180° relative to one another. For example, a reflector can be pointed 45° or 90° relative to the rotation plane. The cover can be designed as a component which can be lifted completely off of the light base member. However, the control cabinet light can also comprise a pivoting mechanism for pivoting the illuminating means cover back and forth between the two positions which are rotated by 180° relative to one another. The illuminating means cover can be designed to be symmetrical in cross section through the rotation plane. The fasteners are not limited to any specific fastener but should preferably be suitable for simple installation of the illuminating means cover onto the light base member without the use of tools. An example of this would be a latch connector or a tongue and groove connection.

The illuminating means cover can be designed to be rectangular, in particular U-shaped, in cross section perpendicular to the longitudinal direction thereof, with the two separated parallel sides between which the illuminating means is disposed when the illuminating means cover is placed onto the light base member and with a side which connects the parallel sides, wherein the light guide extends along the inside or the outside of one of the two separated parallel sides. For example, in this embodiment a reflector can be disposed perpendicular to the rotation plane. The reflector can be a flat or a curved reflector. For example, it can be a reflective coating on the inside of the illuminating means cover, in particular of a side. Basically, the reflector can be aligned parallel to the side associated with the reflector and therefore perpendicular to the rotation plane or aligned at an angle relative to the side associated with the reflector.

The light base member can be connected to the light base member by way of a fastener, designed as a tongue and groove connector, at each of the free longitudinal edges of the parallel sides of the illuminating means cover by way of which the illuminating means cover is placed onto the light base member. For example a projection which extends along the longitudinal edge can be formed at the opposing internal sides of the parallel sides near the free longitudinal edges, the projection engaging into a corresponding longitudinal groove in the light base member. For example, the illuminating means cover can be made of a plastic material so that the cover is elastically deformable and therefore supports the insertion of the projections into the grooves by way of elastic deformation of the illuminating means cover.

In order to further improve the radiation characteristics of the control cabinet light, the transparent illuminating means cover can be designed, at least in sections, as a planar-convex lens or as a Fresnel lens, wherein a convex or spherical side of the planar-convex lens or a stepped structure of the Fresnel lens is formed on an inside of the illuminating means cover facing the illuminating means.

In the process, at least one of the separated parallel sides of the illuminating means cover can be designed as the planar-convex lens or the Fresnel lens, wherein the at least one separated parallel side with the planar-convex lens or Fresnel lens is designed as planar and/or unstructured on an outside of the illuminating means cover away from the illuminating means.

The use of an illuminating means cover in which at least one of the separated parallel sides is designed as a planar-convex lens or a Fresnel lens is suitable in particular in connection with the use of directed light sources such as LEDs or OLEDs since this reduces shaded areas inside control cabinet as is often the case when using directed light sources in particular. Therefore, the illuminating means can be a directed light source, in particular a light source comprising a plurality of LEDs and/or OLEDs, so that the transparent illuminating means cover, which is designed at least in sections as a planar-convex lens or a Fresnel lens, is a diverging lens.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are explained with the aid of the figures below. Shown are.

DETAILED DESCRIPTION

Example embodiments will now be described more fully with reference to the accompanying drawings.

The control cabinet light according to the invention is aimed in particular at avoiding the glare effect of the control cabinet lights from the prior art related to the position of installation. This is achieved by the illuminating means being an illuminating means plate or comprising the same which radiates selectively. Further, the illuminating means cover and a light guide provided therein can be mounted in two positions on the light base member rotated relative to one another by 180° and in accordance with this the area illuminated by the control cabinet light can be varied by similarly varying the orientation of the light guide, which can be a reflector or a lens.

Figure 1:
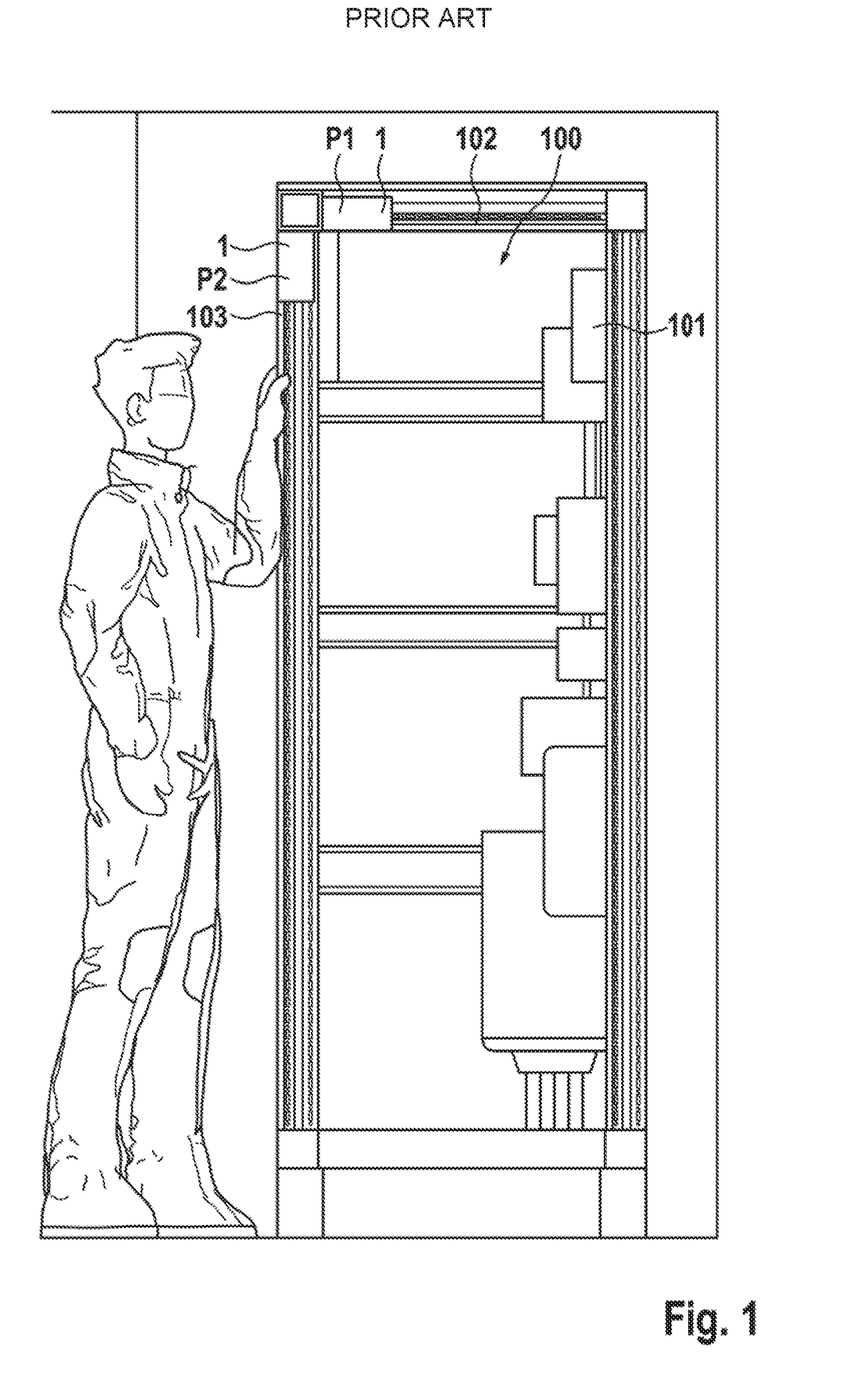
FIG. 1 shows a schematic representation of two installed positions of a control cabinet light.

For example, FIG. 1 shows a first and a second installed position P1, P2 of a control cabinet light 1 according to the prior art. In position P1, for example, the control cabinet light is disposed in the upper horizontal frame of the control cabinet frame profile flush with the horizontal profile 102 so that the control cabinet light in position P1 radiates substantially perpendicular and thereby illuminates the control cabinet interior 100 and control cabinet components 101 comparatively effectively. However, if it is now required to place the control cabinet light 1 from installed position P1 to installed position P2, for example if a ceiling cooler is to be mounted to the control cabinet frame rack and the top side of the control cabinet has to be available for air exchange between the cooler and the interior 100 of the control cabinet, a significant glare effect can issue from the control cabinet light as can be seen in FIG. 2.

Figure 2:
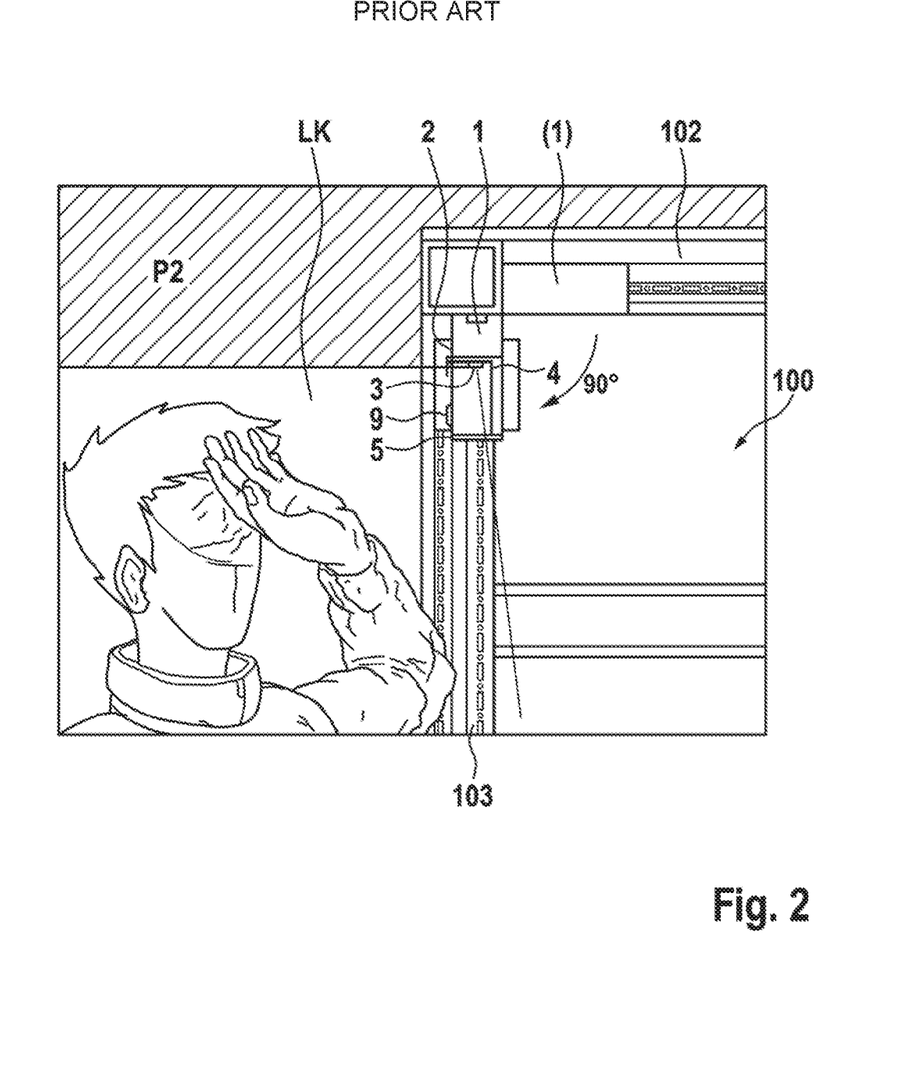
FIG. 2 shows a detailed view of one of the two installed positions according to FIG. 1.

In installed position P2 according to FIG. 2, the control cabinet light 1 is thus disposed within the clear width between two vertical profiles 103 of the control cabinet frame rack. FIG. 2 further shows that the orientation of the control cabinet light in installed position P2 is also preset in that the motion sensor 9, which is designed to trip right when the front control cabinet door is opened, is disposed at a specific side of the control cabinet light 1 which must be pointed straight in the direction of the control cabinet door. It would not make sense, for example, to mount the control cabinet light 1 in installed position P1 rotated by 180° in the horizontal rotation plane such that the sensor 9 points to the interior 100 of the control cabinet, thus not detecting when the control cabinet door opens.

Whereas the control cabinet light 1 provides comparatively good illumination of the interior 100 of the control cabinet in position P1, in installed position P2 according to FIG. 2, considerable glare is created. The light radiation cone from the control cabinet light is indicated by the two edge beams of light cone LK. The fixed location of reflector 4 at the illuminating means cover 5 relative to illuminating means 3 and the non-selective radiation of the illuminating means used, the light cone LK fans out broadly in known control cabinet lights from the prior art and cannot be varied.

Figure 3:
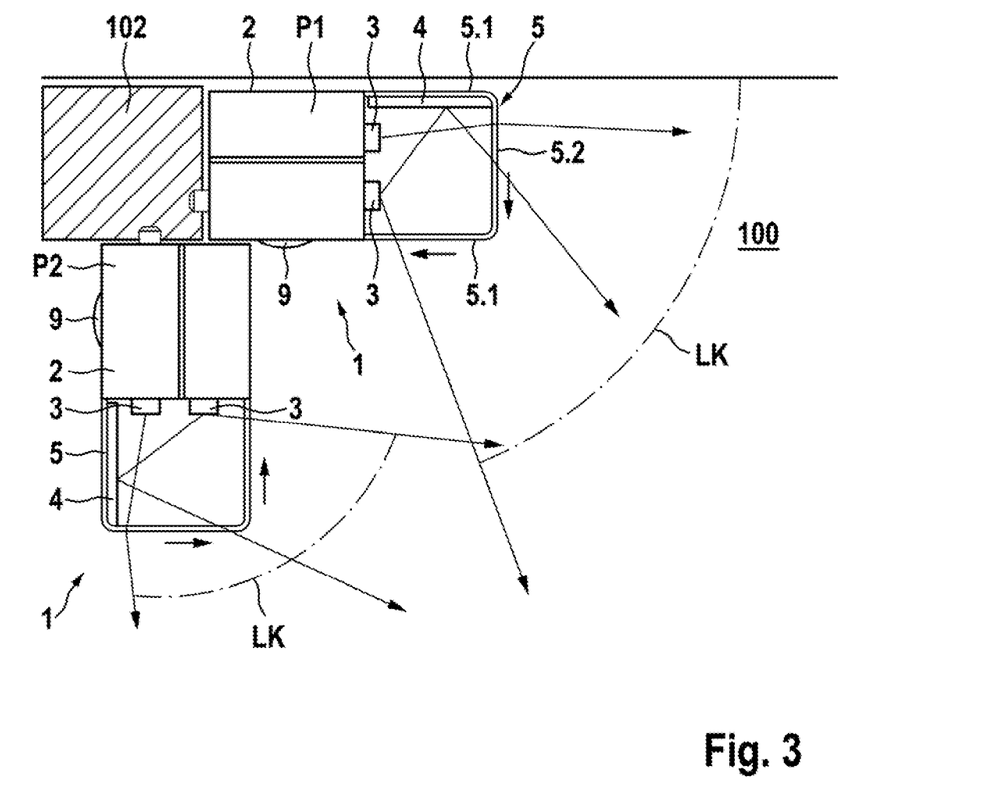
FIG. 3 shows a schematic representation of two installed positions of a control cabinet light according to the invention.
Figure 4:
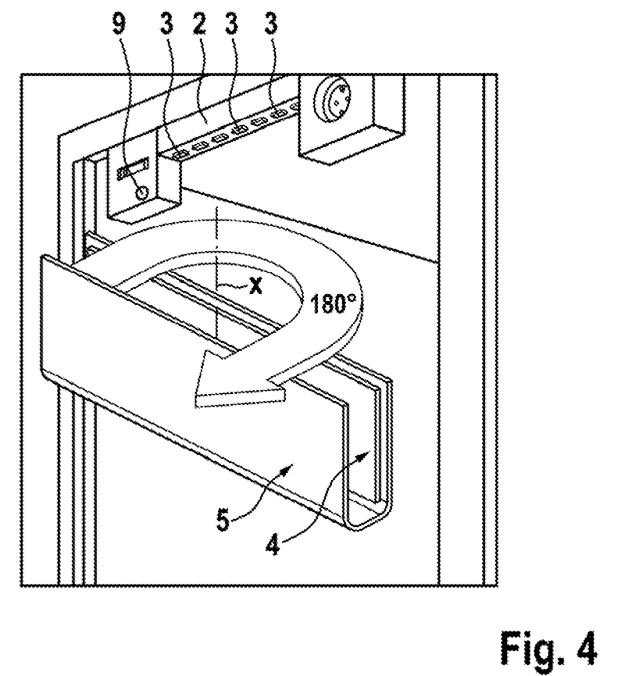
FIG. 4 shows a schematic representation for purposes of illustrating the process of rotating the illuminating means cover.
Figure 5:
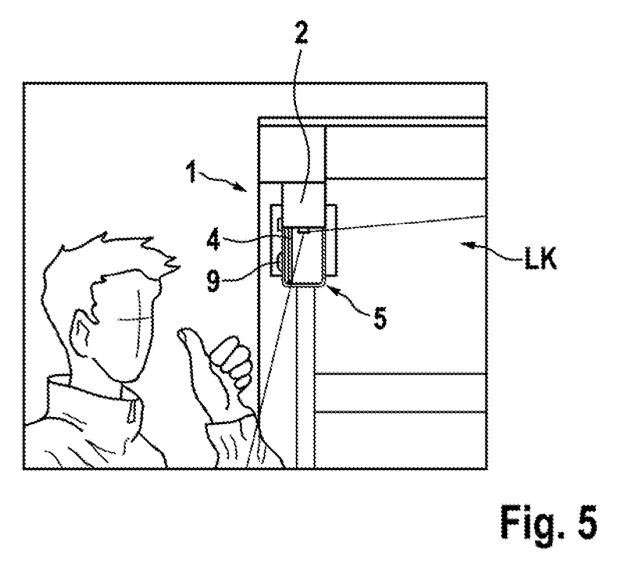
FIG. 5 shows a schematic representation for purposes of illustrating the advantages which result from the control cabinet light according to the invention.

Compared to this, FIGS. 3-5 illustrate the advantages resulting from using the control cabinet light according to the invention. FIG. 3 shows the two installed situations P1, P2 similar to FIGS. 1 and 2, in which the control cabinet light 1 is disposed once in the clear width of the upper horizontal ceiling frame of the control cabinet frame rack and once in the clear width of the vertical, front frame of the control cabinet frame rack. The two positions are again identified by P1 and P2. In the embodiment of the control cabinet light shown, similar to the known control cabinet lights from the prior art, in position P1 the reflector 4 is disposed inside one of the two parallel sides 5.1 of the substantially U-shaped illuminating means cover 5, wherein the illuminating means cover 5 is oriented in such a way that the reflector 4 is disposed at the upper side 5.1 in orientation, and thus facilitates an effective illumination of the control cabinet interior 100.

If now the control cabinet light needs to be moved from position P1 to position P2, the control cabinet light according to the invention permits the illuminating means cover 5 to be mounted shifted by 180° on the light base member 2 so that the reflector 4 changes sides relative to the light base member 2. While reflector 4 is disposed on the side of the light base member 2 away from the sensor 9 in position P1, in position P2 it is disposed on the same side of the light base member 2 where sensor 9 is disposed. In other words, the cover 5 is rotated about its transverse axis X as shown in FIG. 4 to reverse the positions of reflector 4.

In position P2, the reflector 4 thus has the effect that light emitted from illuminating means 3 does not radiate out from the control cabinet but is reflected back into the control cabinet interior 100 and continues to provide optimum illumination of the control cabinet interior even in position P2 similar to position P1.

Figure 6:
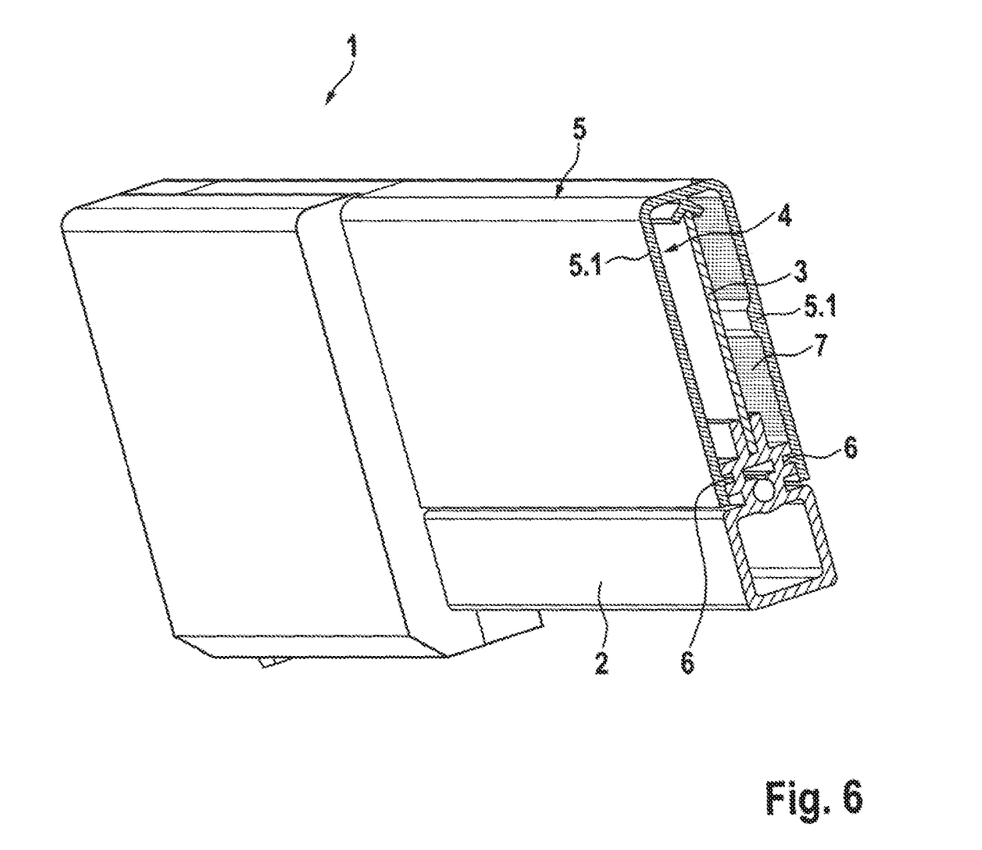
FIG. 6 shows a schematic representation of an embodiment of the control cabinet light in a cross section relative to the longitudinal axis of the control cabinet light.

Finally, FIG. 6 shows another embodiment of the control cabinet light in which the illuminating means 3 is also design as an illuminating means plate. For example, the plate can comprise, on one of the opposing sides thereof, a plurality of LEDs or OLEDs which radiate directed light perpendicular to the plane of the plate. To improve the radiation characteristics of the control cabinet light, a stepped structure is designed on the inside of at least one of the separated parallel sides 5.1 of the illuminating means cover 5 so that the side 5.1 forms a Fresnel lens together with the stepped structure 7.

The light base member 2 comprises a groove running in the longitudinal direction at opposite longitudinal sides facing the insides of the two sides 5.1 and the side 5.1 comprises a corresponding projection at the inside facing the groove, the projection engaging in the groove in the manner of a tongue and groove connection 6 in order to fix the illuminating means cover 5 at the light base member 2 in a manually removable way. In order to place the cover 5 onto the light base member 2 turned by 180° according to FIG. 4, the illuminating means cover 5 is first pulled off of the light base member 2, the tongue and groove connection 6 having to be released in order to do so. After releasing the connection and taking off the illuminating means cover 5, the cover 5 can be rotated by 180° and placed back onto the light base member 2 in such a way that the tongue and groove connection 6 is re-established and thereby the illuminating means cover 5 is fixed onto the light base member 2. In order to simplify taking off and replacing the illuminating means cover 5 on the light base member 2, the grooves and/or projections of the tongue and groove connection can comprise an approach bevel.

The control cabinet light according to the invention makes it possible, simply by rotating the illuminating means cover 5 by 180°, to suppress the frequently occurring glare effect of a control cabinet light which depends on the installed position. This can be done in particular without the light base member having to be moved or fastened somewhere else, which is frequently impossible for primary reasons such as the internal design structure of the control cabinet, the existing power cabling for the control cabinet light, the use of ceiling coolers and the like. The proposed control cabinet light also makes it possible for the illuminating means cover to be moved between the two positions rotated by 180° without the use of tools, thereby making it uncomplicated to handle. Moving parts no longer need to be used for the most part, such as a moving aperture and/or rotatable illuminating means and other aids for directing and focusing light, up to the illuminating means cover itself.

The features of the invention disclosed in the above description, in the drawings and in the claims can be essential both individually as well as in any combination for the implementation of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A control cabinet light for illuminating a control cabinet interior, wherein the control cabinet light comprises a light base member which holds an illuminating means of the control cabinet light and an illuminating means cover mounted at the light base member, said cover transparently surrounding the illuminating means, wherein the illuminating means cover is designed to be U-shaped in cross section perpendicular to the longitudinal direction thereof, with two transparent separated parallel sides between which the illuminating means is disposed when the illuminating means cover is placed on the light base member, and with a further side connecting the separated parallel sides, wherein the illuminating means cover is configured to be mounted in two positions on the light base member, the positions being rotated relative to one another by 180° about an axis transverse to the longitudinal direction, wherein the illuminating means comprises a flat illuminating means plate on which a plurality of individual LEDs or OLEDs, are distributed, and wherein the illuminating means plate extends parallel to the parallel sides of the illuminating means cover, wherein a reflector extends along the inside or the outside of one of the two parallel separated sides, so that the reflector has a different orientation relative to the illuminating means in the two positions of the illuminating means cover which are rotated by 180° relative to one another, whereby light emitted from the illuminating means is reflected back into the control cabinet interior by the reflector.

2. The control cabinet light according to claim 1, in which the light guide extends parallel to the side associated therewith and thus perpendicular to the rotation plane or is at an angle relative to the side associated therewith.

3. The control cabinet light according to claim 1, in which the the illuminating means cover is connected to the light base member by way of a fastener, designed as a tongue and groove connector, at each of the free longitudinal edges of the parallel sides of the illuminating means cover by way of which the illuminating means cover is placed onto the light base member.

4. The control cabinet light according to claim 1, in which the transparent illuminating means cover, in particular at least one of the two parallel sides is designed at least in sections as a planar-convex lens or a Fresnel lens, wherein a convex side of the planar-convex lens or a stepped structure of the Fresnel lens is designed at an inside of the illuminating means cover facing the illuminating means.

5. The control cabinet light according to claim 4, wherein at least one of the separated parallel sides of the illuminating means cover can be designed as the planar-convex lens or the Fresnel lens, wherein the at least one separated parallel side with the planar-convex lens or Fresnel lens is designed as planar and/or unstructured on an outside of the illuminating means cover which faces away from the illuminating means.

6. The control cabinet light according to claim 4, wherein the illuminating means can be a directed light source, in particular a light source comprising a plurality of LEDs and/or OLEDs, so that the transparent illuminating means cover, which is designed at least in sections as a planar-convex lens or a Fresnel lens, is a diverging lens.

* * * * *